Dec. 27, 1932.  C. I. HALL  1,891,926
MIXING VALVE
Filed April 15, 1930
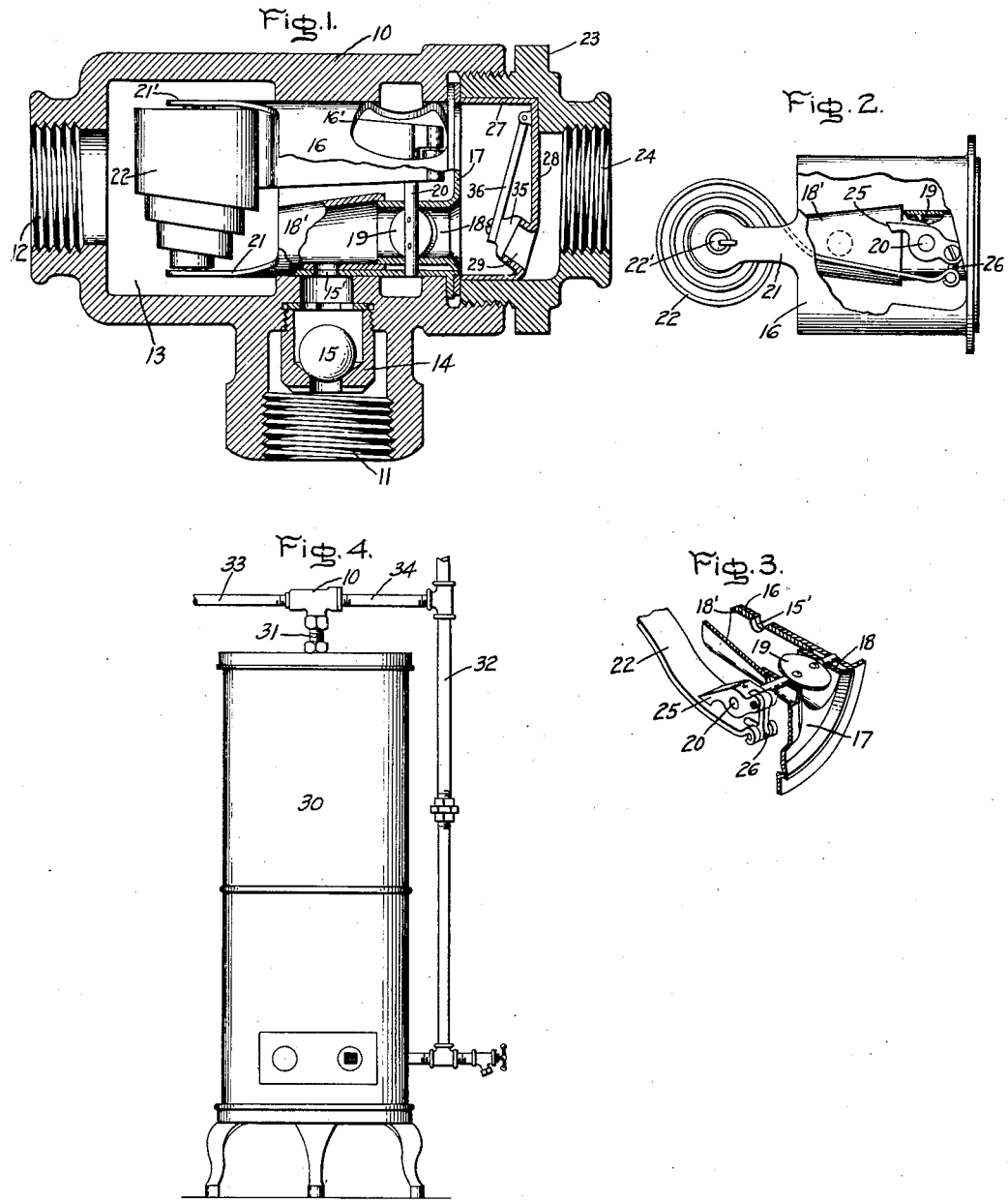
Inventor:
Chester I. Hall,
by Charles V. Tullar
His Attorney.

Patented Dec. 27, 1932

1,891,926

UNITED STATES PATENT OFFICE

CHESTER I. HALL, OF PHILADELPHIA, PENNSYLVANIA, ASSIGNOR, BY MESNE ASSIGNMENTS, TO GENERAL ELECTRIC COMPANY, A CORPORATION OF NEW YORK

MIXING VALVE

Application filed April 15, 1930. Serial No. 444,567.

My invention relates to temperature control devices, more particularly to a mixing valve for automatically controlling the temperature of fluids.

In the ordinary hot water systems for domestic supply the water supplied by the hot water faucet is usually far too hot for contact with the human body and cold water must be added to bring the water to the desired temperature. Where the hot and cold water faucets are separate, the water must be mixed in a receptacle to give the desired temperature by adding to the hot water sufficient cold water from the cold water faucet. Injury from hot water, or at least a discomfort always results from an attempt to obtain water of the desired temperature in this manner. This is particularly true in the case of shower baths.

If the two sources of supply have a common faucet, constant adjustment of the two valves is necessary to produce water of the desired temperature at the faucet and necessitates the use of the hand, with its consequent uncomfortable contact with hot water, to determine when the proper temperature has been obtained.

In addition to being injurious to the hand and other parts of the body which may be exposed to the hot water, the above method of obtaining water at the proper temperature is very inefficient and wasteful, not only in the mixing process, but in keeping the hot water pipes at a temperature above that of the surrounding atmosphere and thus losing heat by radiation and convection.

The applicant is aware that mixing valves have heretofore been made for the purpose of overcoming the above difficulties. However, present devices of this character are not always readily adapted to domestic applications and present an apparatus more or less complicated in structure. This results from the fact that in present devices both the hot and cold water must be controlled, one in the reverse direction from the other, making it necessary to operate through stuffing boxes with a complicated double valve construction.

It is not always convenient to mount the control valves in a position for which the valves might be designed to operate, that is a horizontal or vertical position. Operation might dictate one or the other of the positions above or an intermediate position, whereas installation may be more convenient in other than the operating position. Therefore, a valve which will operate in any position is highly desirable.

It is an object of my invention to provide a means for automatically mixing hot and cold water to produce the desired temperatures at the faucet, which is sturdy, reliable, simple and easy to install and which requires no attention after the installation thereof.

It is another object of my invention to increase the efficiency of the hot water system by reducing the losses in the hot water pipes.

Briefly, the preferred embodiment of my invention consists of a valve casing provided with three openings therein. One opening, which is controlled by an automatic valve, admits the hot water, and another opening, which is controlled by a thermostatic valve and a check valve admits cold water. The water coming into the valve from these two openings passes through a mixing chamber before leaving the casing. Mounted in the mixing chamber is a thermostatic coil which is responsive to the temperature of the water in the mixing chamber to control the valve for admitting the cold water to the mixing chamber. In this manner the proper amount of hot and cold water is supplied to the valve and leaves the valve at the desired temperature. It is apparent that my invention is applicable to other uses and the preferred embodiment is described merely for the purpose of disclosing the invention.

Referring to the drawing, Fig. 1 is a cross section taken through the mixing valve casing; Figs. 2 and 3 show details of the thermostatic valve structure; Fig. 4 shows the application of the mixing valve to a hot water system.

Referring to Fig. 1, the casing 10 is provided with the hot water opening 11, the mixed water outlet 12 and the mixing chamber 13. Mounted to close the opening 11 is a check valve 14 provided with the movable element 15 gravity actuated, which closes the opening 11 when the mixing valve is not used. It is understood of course that this valve could be spring controlled.

Mounted within the valve casing 10 is a tubular member 16 which is closed at one end, as shown at 17, and provided with a tubular passageway therethrough designated by the numeral 18 for admitting cold water to the mixing chamber. The butterfly valve element 19 is rotatably mounted in the passageway 18 upon a shaft 20, the element 19 ordinarily closing said passageway. The tubular member 16 is provided with the extending arms 21 and 21' which extend into the mixing chamber and support the thermostatic coil 22 which is attached at one end to the shaft 20, as shown more clearly in Figs. 2 and 3. An opening 16' in the member 16 permits assembly of the valve and thermostat element within the tubular member. As shown in Fig. 2 the thermostatic coil 22 is rigidly attached at its inner end to a non-rotatable shaft 22' mounted in the arms 21 and 21' of the tubular member 16. The other end of the coil 22 is connected to the shaft 20 upon which is mounted the valve element 19 by means of a link mechanism 26 and the stop member 25 which limits the rotation of the shaft 20. The portion of the thermostatic coil extending between the coiled part and the link mechanism is capable of yielding to overexpansion of the coiled part so that no damage is done to the valve when overexpansion takes place. Mounted within the tubular member 16 is a cone-shaped member or nozzle 18' which is connected with the tubular member 18 and forms an extension thereof. The purpose of the nozzle is to increase turbulence in the flow of hot and cold water therethrough to assist in proper mixing of the water. A passageway 15' is provided in the tubular member 16 and the member 18' to permit the admission of hot water from the passage 11 to the mixing chamber 13 of the valve.

The tubular member 16 with its associated parts is inserted into the valve casing 10 from the right-hand side thereby closing the passage at this side through which the cold water is admitted by means of the thermostatically controlled valve. The tubular member is then held within the valve casing by means of the screw threaded member 23 which is provided with the opening 24.

Inside of member 23 is located a tubular member 27, which is closed at one end as shown at 28 in Fig. 1, and provided with a passageway 29. Mounted at the opening 29 is a valve 35 provided with a movable support 36, gravity or spring actuated, which closes the passageway 29 when the mixing valve is not used, or when there is a tendency for water to back out through passageway 29.

In Fig. 4 the application of the valve to a hot water system is clearly shown. The hot water tank 30 is supplied with water by means of the cold water pipe 32. The hot water outlet 31 of the tank 30 is connected to the valve 10, as shown. The cold water pipe 34 and the outlet pipe 33 are also connected to the valve 10. The valve receives hot water from the tank 30 through the pipe 31 and cold water through the pipe 34 and supplies water at the desired temperature to the pipe 33.

The operation of the device is as follows: When the hot water faucet is opened, due to the fact that the cold water valves 19 and 35 are ordinarily closed, hot water is immediately supplied to the mixing valve through the opening 11. The pressure of the water opens valve 14 and the hot water is admitted to the mixing chamber 13. In response to the temperature of the hot water, the thermostatic coil tends to expand, thus uncoiling and forcing that end of the coil connected with the shaft 20 through the link mechanism 26 to the right as shown in Fig. 2 rotating the shaft 20 about its axis to open the valve 19. When valve 19 is thus opened the pressure of the water also opens valve 35 and cold water enters member 18. Thus, a jet of hot water and a jet of cold water are admitted into the mixing chamber 13 through the nozzle 18'.

In response to the change in temperature of the water in the mixing chamber, the thermostatic element either opens or closes the valve to an extent depending upon the temperature of the water until the proper amount of cold water is mixed with the hot water to produce a mixture in the chamber 13 of the desired temperature.

When there is no longer a demand for a supply of hot water, the movable element 15 of the valve 14 closes the opening of the valve 14 to thereby prevent any circulation of hot water in the pipes. At such times valve 35 also is in the closed position and prevents the backing up of hot water through opening 24 into the cold water pipes 34 and 32. As the water in the mixing chamber 13 cools to a point of the surrounding atmosphere, the thermostatic element 22 contracts to rotate the shaft 20 to close the cold water valve. It will thus be seen that the circulation of hot water in the hot water pipes is prevented and that no heat is lost due to the radiation and convection of heat from the hot water pipes to the surrounding atmosphere.

The embodiment of the invention illustrated and described herein has been selected for the purpose of clearly setting forth the principles involved. It will be apparent, however, that the invention is susceptible of being modified to meet the different conditions encountered in its use. I, therefore, aim to cover by the appended claims all modifications within the true spirit and scope of my invention.

What I claim as new and desire to secure by Letters Patent of the United States is:

1. A mixing device for hot and cold fluid including in combination a casing having a mixing chamber, and an outlet and cold fluid inlet oppositely disposed, a normally closed valve intermediate said outlet and inlet connected to be actuated by the flow of fluid from said chamber for admitting hot fluid thereto, and a valve at one end of said chamber for controlling the admission of cold fluid thereto through said cold fluid inlet to maintain a predetermined temperature of the fluid in the mixing chamber, said last valve being controlled by a thermostatic coil element within said mixing chamber adjacent said outlet.

2. A mixing device for hot and cold fluid having a nozzle for admitting cold water, means ordinarily closed for controlling the flow of cold water through said nozzle, a hot fluid inlet in the side of said nozzle and means responsive to the temperature of the hot water flowing through the nozzle for opening said ordinarily closed means to provide a mixture of hot and cold water of a predetermined temperature.

3. In a mixing device for providing fluid at a predetermined temperature having a mixing chamber, a plurality of valves, one of said valves ordinarily closed controlling the flow of fluid at low temperatures through the control device and positioned at one end of said chamber, thermostatic coil means within said chamber and opposite said valve to control said valve, and another of said valves intermediate said first valve and coil normally closed and actuated by the flow of fluid from the device for controlling the flow of fluid at high temperature through the device, said thermostatic coil means being responsive to the temperature of the fluid at high temperatures flowing through the device to open said one valve.

4. A mixing device for hot and cold fluid including in combination a casing having a mixing chamber, a nozzle for admitting cold fluid to the mixing chamber, a valve for controlling the flow of cold fluid through the nozzle, a thermostatic element disposed in the mixing chamber and connected to operate said valve, and a hot fluid inlet located in the side of said nozzle.

5. In a mixing device provided with a plurality of openings and having a mixing chamber, a normally closed valve for admitting fluid at high temperatures to the mixing chamber through one of the openings, said valve being opened by the flow of fluid from said mixing chamber, a valve ordinarily closed for admitting fluid at low temperatures to the mixing chamber through another of the openings, to provide a mixture of fluid of a predetermined temperature at a third opening, a thermostatic coil mounted in the mixing chamber and connected to said ordinarily closed valve to control the same, said coil being responsive to the temperature of the fluid at high temperatures flowing through the mixing chamber to open the ordinarily closed valve.

6. In a three-way mixing device, means in one way for admitting fluid at high temperatures to the device, a tubular unit provided at one end with arms for extending within the device and a valve for closing the other end, means in said unit supporting said valve and providing a passage through the unit for fluid at low temperatures, thermostatic means supported between said arms for controlling said valve to open the same responsive to the temperature of fluid at high temperatures flowing through said device, and means for fastening said unit within said device to ordinarily close the way through which fluid at low temperatures is admitted.

7. A mixing device for hot and cold fluid including in combination a casing having a mixing chamber, a nozzle for admitting cold fluid to the mixing chamber, a valve for controlling the flow of cold fluid through the nozzle, a thermostatic element disposed in the mixing chamber and connected to operate said valve, a hot fluid inlet located in the side of said nozzle, and a normally closed valve adapted to be actuated by the flow of fluid from said nozzle for controlling the admission of hot fluid through said inlet.

8. A mixing valve for hot and cold water including in combination a substantially T-shaped casing having pipe connections at the end of each leg, an inwardly opening check valve removably mounted in the intermediate leg for admitting hot water therethrough, a thermostatically controlled valve removably mounted in one of the other legs for admitting cold water therethrough, and an inwardly opening check valve removably mounted in the same leg as the thermostatically controlled valve.

9. In combination, a hot water tank provided with a cold water supply means and a hot water outlet means, a mixing device connected intermediate its ends to said hot water outlet means and at one end to said supply means, said device having an outlet at its other end, a normally closed valve adapted to be actuated by a flow of water from said mixing device for controlling the admission of hot water to said mixing device, a cold water butterfly valve for admitting cold water to said mixing valve to provide water of a predetermined temperature leaving said device, and a thermostatic coil means within said device and responsive to the temperature of the water flowing from said device to control said cold water valve.

10. In a mixing device having a mixing chamber, a gravity actuated valve for controlling the admission of fluid at high temperatures to said chamber, a unit disposed within said chamber and provided with a valve for closing the end of said chamber through which fluid at a low temperature is admitted, arms on said unit extending into the chamber, a thermostatic coil supported between said arms and yieldingly connected to said last valve to control the opening and closing thereof to admit fluid at low temperatures to the mixing chamber, means for supporting said unit within said chamber, said thermostatic means operating in response to the temperature of fluid at high temperatures flowing through the device to open said last valve to provide a mixture of said fluid at a given temperature in said mixing chamber, a stop means associated with said thermostatic means and said last valve for limiting movement of said valve to the open position, and a valve to prevent exit of water through the opening which normally admits fluid at low temperature.

11. An apparatus for mixing liquids of different temperatures comprising separate sources of supply of the two liquids, a mixing element with which said separate sources are connected, comprising a casing adapted to be connected to two separate sources of liquid supply, a hollow supporting element mounted in said casing, a tube in said supporting element open at both ends, a valve member in said tube, an opening in said tube at one side of said valve member adapted to communicate with one liquid source of supply, a thermostatic element connected with said supporting member and having a part which projects along said tube, and a connection between said part and said valve member whereby the valve member is controlled responsive to the temperature of the liquid passing through the mixing element.

12. An apparatus for mixing liquid of different temperatures comprising a casing adapted to be connected to two separate sources of liquid supply, said casing provided with an outlet, a supporting member in said casing having a passageway therethrough, said passageway having connections to both of said sources of liquid supply, a valve member in said passage intermediate said connections and a connection between said valve member and said thermostatic device whereby the valve member is controlled responsive to variations in temperature of the liquid passing through the mixing element, and a check valve in said casing in the connection leading to one of the sources of liquid supply.

13. An apparatus for mixing liquids of different temperatures comprising a casing, adapted to be connected with separate sources of liquid supply, a hollow supporting member in said casing, said casing provided with a passageway having separated connections with said sources of liquid supply, the valve member in said passageway intermediate said connections, a shaft upon which said valve member is mounted, a thermostatic element carried by said support and having a projection thereon, a connection between said projection and said shaft and a stop connected with said shaft for limiting the movement of said valve member produced by said thermostatic element.

In witness whereof, I have hereunto set my hand this 10th day of April, 1930.

CHESTER I. HALL.